United States Patent [19]

Campagnolo

[11] 4,437,679
[45] Mar. 20, 1984

[54] TUBE STRUCTURE FOR BICYCLE AND MOTORCYCLE FRAMES

[76] Inventor: Tullio Campagnolo, Via della Chimica, 36100 Vicenza, Italy

[21] Appl. No.: 365,910

[22] Filed: Apr. 6, 1982

[30] Foreign Application Priority Data

Apr. 15, 1981 [IT] Italy .................................... 21177/81
Apr. 15, 1981 [IT] Italy .................................... 21178/81
Jun. 19, 1981 [IT] Italy .................................... 22435/81

[51] Int. Cl.³ .............................................. B62K 19/02
[52] U.S. Cl. ................................ 280/281 R; 138/141; 138/174; 138/DIG. 11
[58] Field of Search ........ 280/281 R, 281 LP, 281 W, 280/281 B, 274, 279; 138/140, 141, 143, 153, 172, 174, 177, DIG. 11; 428/398; 296/205; 244/117 R, 119, 131, 133

[56] References Cited

U.S. PATENT DOCUMENTS 556,805  3/1896  Carlson ................................ 280/279
2,261,912  11/1941  Buente .................................. 138/177
3,451,434  6/1969  Bauer ................................... 138/172
3,966,230  6/1976  Nicol .................................. 280/281 R

*Primary Examiner*—Joseph F. Peters, Jr.
*Assistant Examiner*—D. Lynn Fugate
*Attorney, Agent, or Firm*—Young & Thompson

[57] ABSTRACT

A light and strong tube structure for frames of bicycles and motorcycles has its cross sections with a variable thickness of the tube wall. Said wall is formed by two or more layers of different materials, of which at least one is metallic material and at least another one has a preferential direction of tensile strength. Preferably, the straight cross sections of the tube are outwardly defined by a circle and inwardly defined by an ellipse and the said layers comprise an external metallic layer and an internal layer of fibers incorporated into resin.

16 Claims, 11 Drawing Figures

TUBE STRUCTURE FOR BICYCLE AND MOTORCYCLE FRAMES

BACKGROUND OF THE INVENTION

The present invention relates to an improved tube structure, particularly a tube structure designed to be chiefly subject to bending stress and required to be as light as possible.

More specifically, the present invention relates to a tube for bicycle and motorcycle frames having improved characteristics, especially suited for forming frames of competition bicycles with highly distinctive features.

As known, various types of tubes—easy to be found on the present market—have been made available by technique for the forming of bicycle and motorcycle frames. While, for the more common constructions, use is made of simple ordinary cylindrical tubes of uniform thickness, when special frames are constructed—wherein a great lightness has to be combined with a high rigidity—the following types of tubes are currently used: (a) special steel tubes with reduced uniform thicknesses; (b) special steel tubes with longitudinally variable thicknesses; (c) light alloy tubes with uniform thickness; (d) light alloy tubes of uniform thickness, with reinforcements in specific sections applied by glueing inserts.

In all these types of tubes, each straight cross section has a uniform thickness of the tube wall.

It is evident that, in order to improve the characteristics of these tubes, it is necessary to simultaneously increase their stiffness and lightness, that is, to work on two characteristics which are inversely proportional one in respect to the other: in fact, an increase of the lightness is usually prejudicial to the stiffness, both if obtained by acting on the proportioning of the parts and if obtained through choice of the materials. Modern metallurgy and the expedients adopted in proportioning and planning the structures have allowed, in recent years, to achieve important progresses, but the requirements are increasingly pressing particularly in frames for competition bicycles, wherein stiffness is an essential element for a proper and lasting response of the machine to the athlete's requirements—increasingly tending to reach border-line results—and wherein lightness even forms part of the factors which contribute to said border-line results, extolling the performances of the athlete-machine binomial. In the case of motorcycles, the requirements are perhaps less sophisticated, but nonetheless felt, in view of the constructive and energetic problems wherein lightness and stiffness play an important part, particularly from the economical point of view.

In facing the aforementioned problems for the setting up of an improved tube structure for bicycle and motorcycle frames, the Applicant has discovered that, in said frames, the traditional structure of the manufactured article and the components forming said article are apt to guarantee a high and sufficient stiffness on the plane (vertically and longitudinally to the running direction of the vehicle) of said frame, whereas transversally to said plane the stiffness never reaches high values. On the other hand, particularly in bicycle frames, the transversal stiffness is of considerable importance, since the effort made by the cyclist, as well as moving the bicycle forward also turns into a torque tending to cause a transversal flexure in the frame.

Thus, the more flexible the transversal plane of the frame, the higher the cyclist's efforts being wasted, due to said passive torque, to the detriment of a successful performance. In short, the higher the transversal flexure, the lower the cyclist's performance. It thus appears evident that it is imperative for competition bicycles, and appropriate for normal bicycles and motorcycles, to be equipped with frames having a high transversal stiffness and therefore with tubes apt to guarantee such high transversal stiffness to the frames, without losing in lightness.

In view of the aforespecified problems and requirements, the object of the present invention is an improved tube structure designed to be chiefly subject to bending stress and especially suited for forming frames of bicycles and motorcycles with highly distinctive features.

SUMMARY OF THE INVENTION

Said tube structure is essentially characterized in that its straight cross sections have a variable thickness of the walls of the tube structure.

Preferably, in said structure, the tube wall is formed by two or more interconnected layers of different materials, at least one of them being metallic material and at least another of them having a preferential direction of tensile strength; for instance said structure is formed of a metallic tube lined with a layer of carbon fibers, positioned longitudinally to the tube (or else distributed in a helical, or slanting, or interwoven arrangement) and incorporated into an epoxy resin through which they become integral with said tube.

More particularly, the present invention relates to a tube structure for bicycle or motorcycle frames, formed by a metallic tube having a section outwardly defined by a circle and inwardly defined by an ellipse (or oval curve) with the focuses onto a diameter of said circle, and by a lining of fibers incorporated in resin, said lining being applied inside said metal tube and having a section outwardly defined by the said ellipse (or oval curve) and inwardly defined by a second ellipse with the focuses aligned with those of the first ellipse.

The present invention also relates to a frame for bicycles, especially competition bicycles, or for motorcycles, obtained by using tube structures as defined hereabove, and more specifically to a frame wherein the tubes having said structures are all positioned so that their cross sections are arranged with their minimum thickness in correspondence of the plane of the frame.

A frame of this type allows to solve the important problems in the planning of bicycles and motorcycles, mentioned further above and, in particular, the problem of obtaining in competition bicycles a very high rigidity transverse to the plane of the frame, combined with a very great lightness (guaranteed by the specific weight of the tubes forming the frame, which is below that of the lightest traditional tubes).

BRIEF DESCRIPTION OF THE DRAWINGS

The invention will now be described in further detail, by mere way of example, with reference to the accompanying drawings, which show some preferred embodiments thereof and in which.

DESCRIPTION OF THE PREFERRED EMBODIMENT

Referring first of all to FIGS. 1 to 4 of the drawings, the tube structure according to the invention is formed (FIGS. 1 and 2) of a metallic tube 2 internally provided with a lining 3 of a material having a tensile strength increased longitudinally to the tube.

The tube 2 is preferably made of a light metal, as aluminium, magnesium or a light alloy, while the lining 3 thereof consists of fibers, preferably carbon fibers, positioned either longitudinally, or slanting, or interwoven, in respect of the tube 2 and associated thereto through a mass of resin, preferably epoxy resin, into which they are incorporated.

Figure 1:
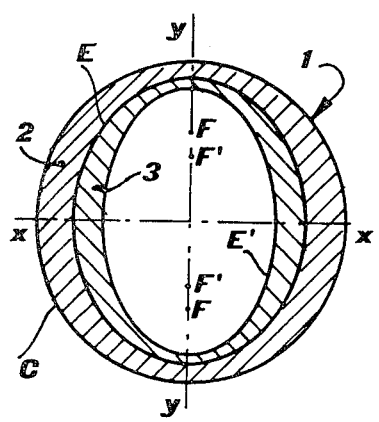
FIG. 1 is a straight cross section of a preferred tube structure according to the invention.

As shown in FIG. 1 of the drawing, the tube 2 has its straight cross section outwardly defined by a circle C and inwardly defined by an ellipse E centered within the circle C. The inner lining 3 of the tube 2 is in turn applied with a thickness variable in proportion to that of the tube 1 and its cross section is outwardly defined by the ellipse E and inwardly defined by a second ellipse E', centered within the first ellipse. The focuses F—F and F'—F' of these ellipses E and E' are, as seen, aligned on the diameter Y—Y of the circle C.

Figure 2:
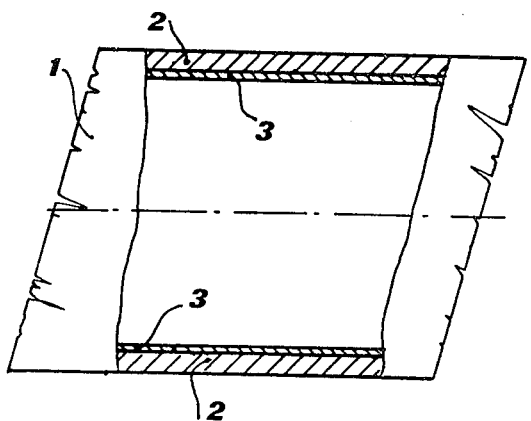
FIG. 2 is a partly sectioned external view of the preferred tube structure of FIG. 1.

In a tube structure as that heretofore described and illustrated in FIGS. 1 and 2, it has substantially been worked in the sense of transferring material from the areas crossed by the axis y—y of FIG. 1 towards the areas crossed by the axis x—x of the same figure, the maximum thickness of such structure being therefore obtained in correspondence of said areas. In this manner, it has evidently been possible to obtain a notable increase in the bending strength of the structure—the material employed and, thus, the weight of the tube being the same—under the action of forces acting on the plane x—x of FIG. 1, or parallel thereto (and tending to actually bend the structure in said plane), while the bending strength of such structure is correspondingly reduced under the action of forces acting on the plane y—y of the same figure.

Figure 3:
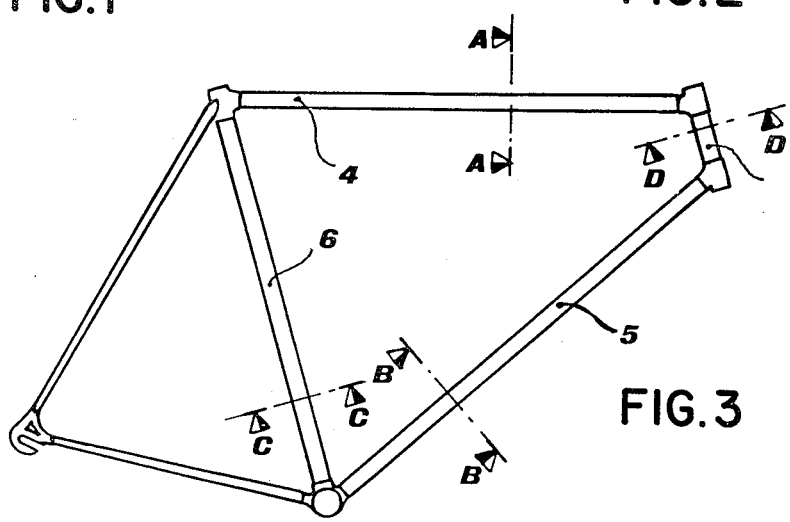
FIG. 3 is a general schematic view of a bicycle frame according to the invention, obtained with tubes having the structure of the tube of FIGS. 1 and 2.
Figure 4A:
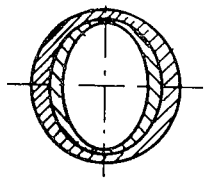
FIGS. 4a to 4d are straight cross sections along lines A—A, B—B, C—C, D—D, on a very enlarged scale, through the tubes of the frame of FIG. 3.
Figure 4B:
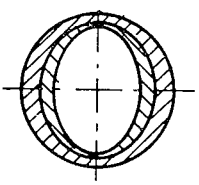
Figure 4C:
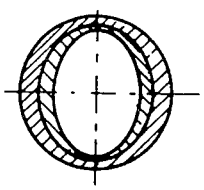
Figure 4D:
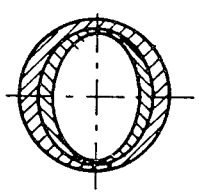

With tubes having a structure equal or similar to that heretofore described and illustrated in FIGS. 1 and 2, one forms the bicycle frame according to the invention, shown in FIGS. 3 and 4. In said frame, the various tubes 4, 5, 6, are mounted, in respect of their longitudinal axes and of the plane of the frame being formed, so as to position their straight cross sections (as shown in FIGS. 4a to 4d) with their thickest areas arranged at the sides of the frame and their thinnest parts lying in correspondence of the plane of the frame.

A frame thus formed possesses—with an equal weight of the tubes employed—a notably higher rigidity, transversally to its own plane, than the traditional frames. Since, on the other hand, the reduced rigidity in the plane of the frame does not create any inconveniences, such rigidity normally exceeding the requirements of use, the frame described and illustrated fully and efficiently accomplishes the objects of the invention, being to obtain a bicycle frame of great lightness and high rigidity, apt to satisfy the strictest requirements in the field of cycling competitions.

Corresponding advantages are evidently obtained by producing frames, based on the same principles, for use in the sports and travelling bicycles found on the market, and in motorcycles.

Figure 5:
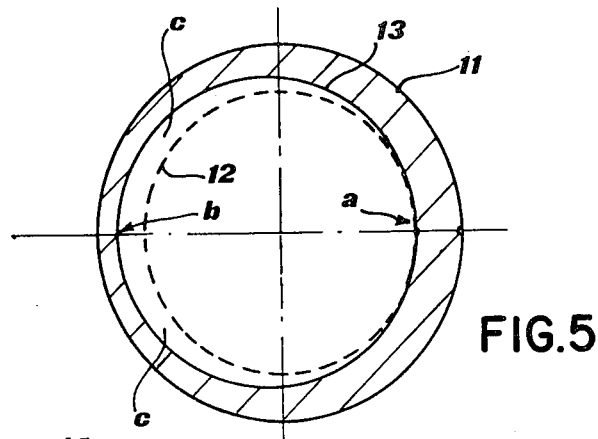
FIGS. 5 to 7 are section views of some embodiments of a simplified tube structure according to the invention.
Figures 6, 7:
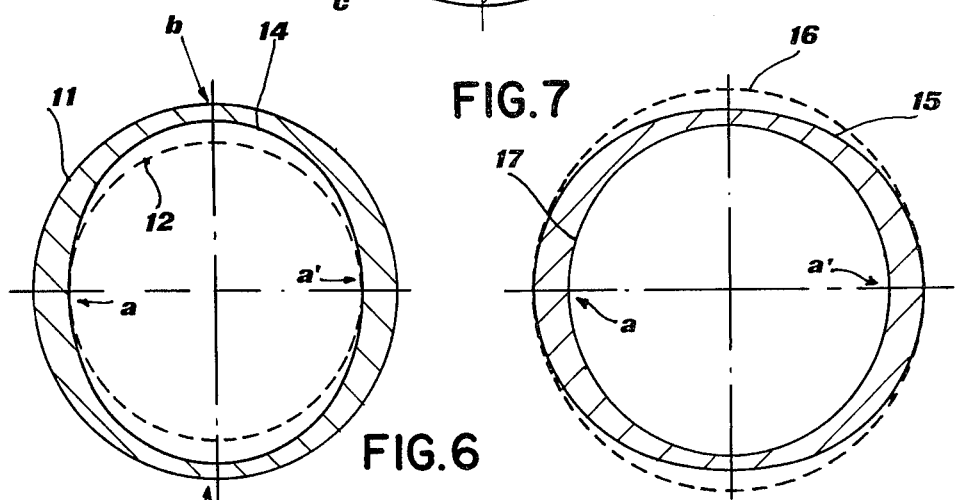

FIGS. 5 to 7 of the drawings show the straight cross sections of some simplified structures of the tube according to the invention. These structures comprise only the essential characteristic of the invention, that is, having the wall of variable thickness, with the material concentrated in the areas designed to undergo higher stresses and removed from the areas less subject to stresses, such structures being thus formed of a simple metallic tube, without any lining.

In the embodiment of FIG. 5, the tube structure has a section outwardly defined by a circle 11 and inwardly defined by a circle 13 which is not centered in respect of the circle 11, instead of being defined by the circle 12 concentric to the outer circle 11. This allows to preserve the wall thickness of the tube, as planned, there where the material is subject to highest stress, namely in correspondence of the area a, and to progressively reduce said thickness towards the diametrally opposed area b of minimum thickness, without weakening the structure and obtaining at the same time a significant saving of material (and a consequent considerable lightening of the tube), as it appears evident from the area c lying between the curves 12 and 13.

The embodiment of FIG. 6 similarly provides for two areas a and a' of maximum thickness and two areas b and b' of minimum thickness of the tube wall, these two areas being connected by arcs of an ellipse 14, centered within the circle 11 which outwardly defines the section. Also in this case, the reference 12 indicates the circle which inwardly defines the section of a corresponding conventional tube. It is evident that the structure will be apt to stand higher stresses in two areas a and a' positioned symmetrically. Consequently, a tube of this type can be used—like that of FIGS. 1 to 4—more frequently and conveniently than the tube of FIG. 5, and it may be simpler to mount, though evidently each type of tube will have to be chosen or preferred according to the use made thereof.

In the embodiment of FIG. 7 the tube structure according to the invention has a section with a design inverted in respect to that of the embodiment shown in FIG. 6, in the sense that the said section is outwardly defined by an ellipse 15 (instead of a circle 16) and inwardly defined by a circle 17, centered in respect of the ellipse 15. While from the structural point of view the differences are negligible, from the point of view of external appearance the two tubes are rather different. Furthermore, in the tube of FIG. 7, the areas a, a' of maximum thickness appear quite evident from the outside, which may in certain cases be helpful for mounting purposes. This last advantage may of course suggest to apply the shape of the tube section of FIG. 7 to the tube 2 of FIGS. 1 to 4.

It is understood that, though the curves 14 and 15 of FIGS. 6 and 7 have been defined as ellipses, they could also—with similar results—be defined as oval curves.

It is also understood that the tube structures having the sections illustrated in the heretofore described FIGS. 5 to 7, should be mounted—particularly for forming frames of bicycles or motorcycles—with an accurate positioning, which should correspond to the real needs and should take into account the actual stresses involved and their possible variations, as already mentioned for the structure of FIGS. 1 and 2 forming the frame of FIG. 3.

Figure 8:
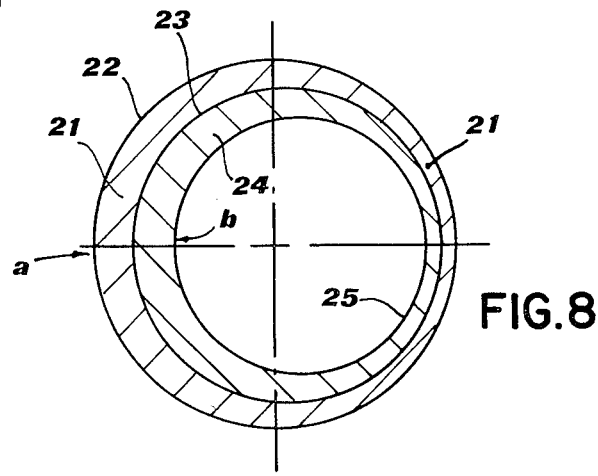
FIG. 8 is a section view of a possible variant of the preferred tube structure of FIGS. 1 and 2.

FIG. 8 finally shows, by way of indication, one of the many possible modifications of the preferred embodiment of the tube structure according to the invention, illustrated in FIGS. 1 to 4.

According to this modification, the tube structure comprises a metallic tube 21, the straight cross section of which is defined by two non-concentric circles 22 and 23 and is thus of variable thickness, and an internal lining 24 of said tube, consisting of a layer of carbon fibers and resin, applied inside the tube 21 and also varying in thickness in correspondence of the straight cross section of the structure. Such layer will have its maximum thickness in the area b corresponding to the thickest area a of the tube 21, the section of said layer being outwardly defined by the circle 23 and inwardly defined by a circle 25, which is not centered within the first circle.

In this modified embodiment, the circles 23 and 25 and possibly the circle 22 may be replaced by other figures, such as preferably ellipses or oval curves, without thereby departing from the scope of the invention.

It is understood that the aforedescribed and illustrated tube structures according to the invention have been given by mere way of example and that there may be other practical embodiments of the invention, for what concerns the geometrical configurations of the sections, their relative size proportions, and the materials and positioning of the layers. In particular, as regards to the shape of the sections, all kinds of modifications are possible as to the choice of the geometrical figures which define the straight cross section of the tube, as to the manner of reciprocally associating said figures, as to the choice of the tube wall thicknesses in said association, and so on. In this way, according to the intended use of the structure and to each specific planning or stress problem involved, the designers will be able—depending on their capability—to realize different tube structures, specifically suited for the problem to be solved, but always with the positive advantage of obtaining a stiffness in the frames manufactured responding to the requirements of use of such frames, together with a lightening of the structure which would otherwise be unthinkable if the usual present technologies were to be adopted.

Concerning the application of the linings or layers of materials with a preferential direction of tensile strength, it is evident that the wide possibilities of application, by means of resin, of the carbon fibers or of similar materials, allows to study the tube structures for bicycle frames—case by case—with the strictest adhesion to the requirements of construction and performance, and to therefore plan such structures in the most rational manner, thereby obtaining results up to date considered unattainable.

It should be noted that the said linings or layers can also be applied partially or discontinuously, in correspondence of areas or along directions of the only surfaces of the metallic tube, that is, merely where an increase of the tensile strength is required, and this not only on the plane of the sections shown in the figures of the drawings, but also longitudinally. Furthermore, it may be possible to adopt linings wherein the fibers, instead of being disposed longitudinally, have helical or interwoven arrangements.

As to the methods for manufacturing tube structures such as those being claimed herein, no limitations should be here set, especially as, considering the movelty of such structures, the problem can probably be faced and solved in many and different ways, or with appropriately studied technologies. However, the manufacturing process suggested to be the most efficient and reliable—at the Applicant's state of experiments——and probably the most convenient and advisable, is meant to be the extrusion process.

Concerning the materials, it is also evident that no limitations exist. Nevertheless, particularly for use in the construction of frames for bicycles and motorcycles, it seems obvious that the tube structure according to the invention should be preferably made of special steel, or aluminium, or magnesium, or any other of the most widely spread light alloys having high strength.

It is anyhow understood that any other variant or modification, which will appear evident to the technicians skilled in the art, will have to be considered as falling within the scope of the present invention.

I claim:

1. Light and strong tube structure for frames of bicycles and motorcycles, said tube structure having a cross section having a variable wall thickness wall, said structure being comprised by at least two interconnected layers of different materials, at least one said layer being metallic and at least another said layer having a preferential direction of tensile strength.

2. Tube structure as in claim 1, formed of a metallic tube internally lined with a layer of fibers, positioned longitudinally of the tube and incorporated into a resin through which they become integral with said tube.

3. Tube structure as in claim 2, wherein said resin is an epoxy resin.

4. Tube structure as claimed in claim 2, in which said fibers are helically arranged.

5. Tube structure as claimed in claim 2, in which said fibers are interwoven.

6. Tube structure as in claim 1, wherein the layer of material having a preferential direction of tensile strength is formed of carbon fibers.

7. Tube structure as in claim 1, wherein the thickness of the layer having a preferential direction of tensile strength varies in the same direction and proportionally to that of the metallic layer.

8. Tube structure as in claim 1, wherein the layer of material having a preferential direction of tensile strength is applied to only a portion of the other layers.

9. Light and strong tube structure for frames of bicycles and motorcycles, said tube structure having a cross section having a variable wall thickness, said cross section being defined by two non-concentric circles.

10. Light and strong tube structure, the straight cross section of which having a variable wall thickness, said wall being formed by two or more layers of different materials, at least one of them being a metallic tube and at least another one of them comprising a lining of fibers incorporated into resin, said lining having a preferential direction of tensile strength, characterized in that said straight cross section of the tube is defined by a circle and by an ellipse.

11. Tube structure as in claim 10, wherein also each of said layers have straight cross section of variable thickness.

12. Tube structure as in claim 10, wherein said metallic tube has a section outwardly defined by a circle and inwardly defined by an ellipse with the focuses onto a diameter of said circle, and wherein the lining of fibers incorporated into resin is applied inside said metallic tube and has a section which is outwardly defined by the said ellipse and inwardly defined by a second ellipse, with the focuses aligned with those of the first ellipse.

13. Tube structure as in claim 12, wherein the focuses of said second ellipse do not coincide with the focuses of the first ellipse.

14. Frame for bicycles, especially competition bicycles, or for motorcycles, characterized in that it is obtained by using tubes having a structure as described in claim 10.

15. Frame as in claim 14, wherein said tubes are all positioned so that the cross sections thereof are arranged with their own minimum wall thicknesses in correspondence of the plane of the frame.

16. Frame as in claim 14, wherein the tubes are all positioned so that the diameter of the circle which outwardly defines the section of the metallic tube—containing the focuses of the ellipses which inwardly define the section of the metallic tube and which outwardly and inwardly define the section of the lining of fibers incorporated into resin—lies on the plane of the frame.

* * * * *